Sept. 17, 1935.    A. RINDERKNECHT    2,014,668
MEANS FOR EXAMINING GEAR WHEELS
Filed July 19, 1933    3 Sheets-Sheet 1

Inventor:
August Rinderknecht
by Karl Michaelis
Atty.

Sept. 17, 1935.  A. RINDERKNECHT  2,014,668
MEANS FOR EXAMINING GEAR WHEELS
Filed July 19, 1933  3 Sheets-Sheet 2
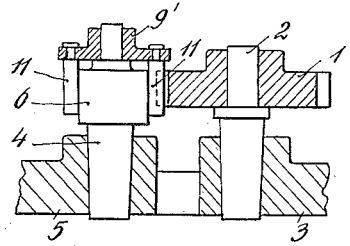
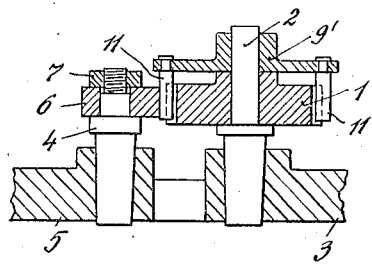
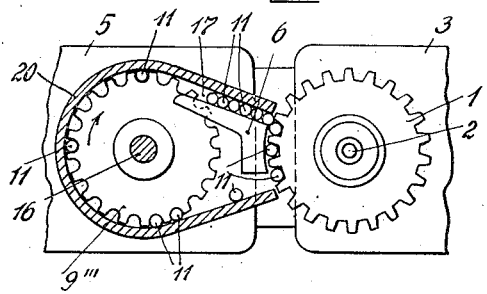
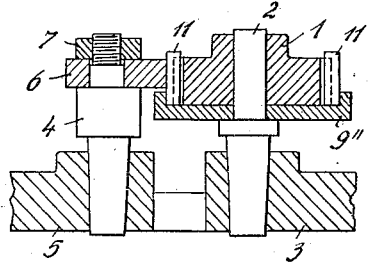
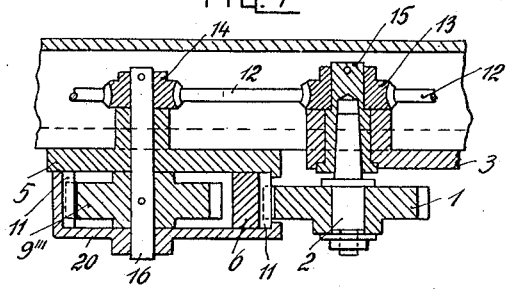
Inventor:
August Rinderknecht
by Karl Michaelis
Atty.

Sept. 17, 1935.    A. RINDERKNECHT    2,014,668
MEANS FOR EXAMINING GEAR WHEELS
Filed July 19, 1933    3 Sheets-Sheet 3

Inventor:
August Rinderknecht
by Karukichauer
Atty.

Patented Sept. 17, 1935

2,014,668

UNITED STATES PATENT OFFICE

2,014,668

MEANS FOR EXAMINING GEAR WHEELS

August Rinderknecht, Esslingen-on-the-Neckar, Germany

Application July 19, 1933, Serial No. 681,215
In Germany August 8, 1932

7 Claims. (Cl. 33—174)

My invention relates to the examination of gear wheels with respect to eccentricity and irregularities of pitch. It is an object of my invention to provide novel and particularly efficient means adapted for this purpose.

Heretofore two methods for examining toothed wheels have been proposed. According to the first method the wheel to be examined is rolled on a master gear, the wheel and the gear being mounted on pins which are displaceable with respect to each other, a spring being provided tending to draw the pins against each other. Any eccentricity or irregularity of pitch of the wheel to be examined causes a variation of the distance of the pins which can be observed or recorded in a diagram. This method involves the drawback that always a plurality of teeth of the wheel and the master gear are in engagement simultaneously and that in consequence thereof in the diagrams the influences of eccentricity and irregularity of pitch cannot be distinguished from each other.

According to the second method pins are inserted in the gaps between the teeth so that the pins abut against the flanks of the teeth. The distances from the centre of the wheel to the peripheries of the pins are measured by means of a micrometer, an end gauge or the like. This method involves the drawback that it requires a very long time to thoroughly examine a wheel.

It is an object of my invention to provide means for examining toothed wheels which allow exactly examining the wheel in a short time. I accomplish this by inserting pins in the gaps between some teeth of the wheel, by rolling the wheel and the pins on an abutment and by observing the variations of distance between the wheel and the abutment.

In a preferred embodiment of my invention the pins are supported by a suitable holder operatively connected to the wheel or to the abutment.

In the drawings affixed to this specification and forming part thereof some embodiments of my invention are illustrated diagrammatically by way of example.

In the drawings

Figs. 3–5 are vertical sections illustrating three further embodiments of my invention.

Fig. 6 is a side elevation, partly in section of a fifth embodiment and

Fig. 7 is a plan view partly in section of the device shown in Fig. 6.

Figure 2:
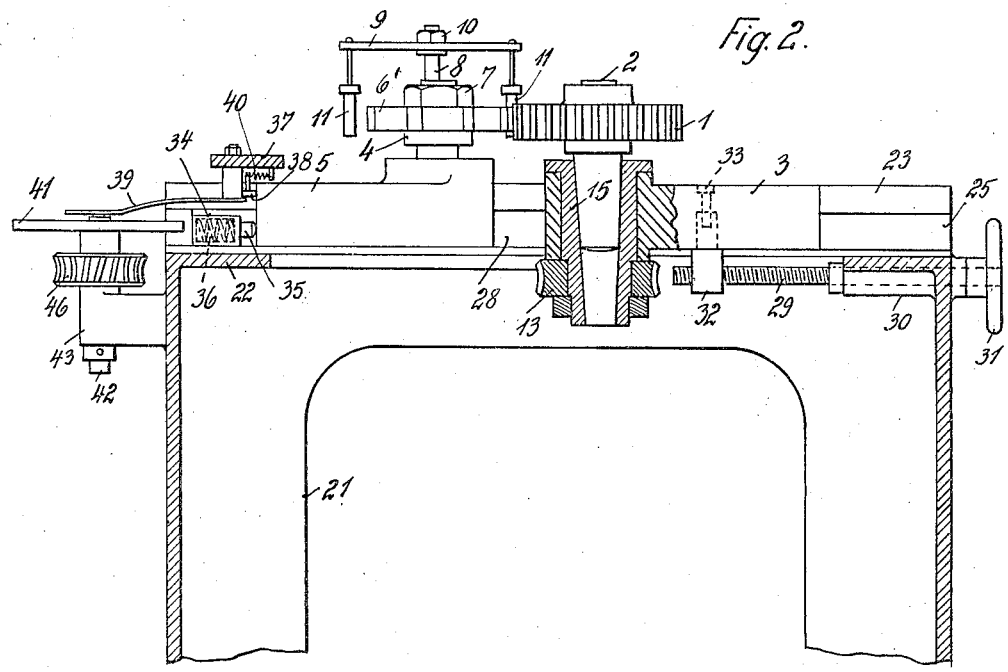
Fig. 2 is a section on the line II—II in Fig. 1.
Figure 1:
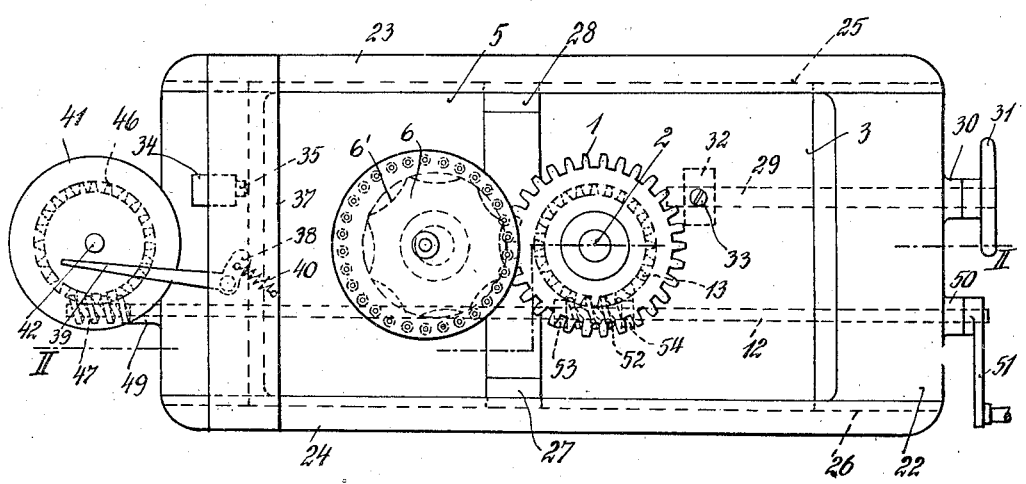
Fig. 1 is a plan view of the first embodiment.

Referring to the drawings and first to Figs. 1 and 2, 21 is a frame or bed of any suitable material, such as cast iron, and 22 is its top plate. The top plate 22 is equipped with two parallel flanges 23 and 24 at its sides whose inner edges are grooved at 25 and 26, respectively. Two slides 3 and 5 are mounted to slide in the grooves 25 and 26 with suitable guiding strips at their sides, and their movement toward each other is limited by stops 27 and 28 in the respective grooves. 29 is a threaded spindle which is mounted for rotation in a bearing 30 below the top plate 22 and the slide 3, and 31 is a hand wheel on the outer end of the spindle for rotating it. 32 is a nut which is threaded for the reception of the inner end of the spindle 29 and is secured to the lower face of slide 3 by a screw 33.

34 is a casing which is secured on the top plate 22 at that end of the device which is opposite the bearing 30 for the spindle 29, 35 is a spring buffer in the casing, and 36 is a spring which urges the buffer against the outer end of slide 5, forcing the inner end of the slide against stops 27 and 28.

A bridge 37 is placed on the flanges 23 and 24 and extends across the outer end of slide 5. Fulcrumed to the lower side of the bridge is a bellcrank 38, 39 whose shorter arm 38 is held against the outer edge of slide 5 by a spring 40 and whose longer arm 39 indicates or records the test results on a chart which is placed on a disk 41. The shaft 42 of the disk is mounted to rotate in a bearing 43 on the frame 21. I is the toothed wheel to be examined with respect to eccentricity and irregularities of pitch. The wheel is rotatably mounted on a journal 2 supported by the slide 3 which can be displaced by the screw spindle 29, as described. The lower end of journal 2 is tapered and is inserted in a corresponding sleeve 15. The sleeve is mounted to rotate in the slide 3 and at its lower end supports a worm wheel 13. 6 is an abutment rotatably arranged on a journal 4 carried by the slide 5 pushed towards the slide 3 by means of the spring buffer 35 or the like. The displacement of the slide 5 is limited to a few millimetres by stops 27 and 28. 7 is a nut securing the abutment 6 in its position on the journal 4. The abutment 6 has a contour corresponding to a circle provided with circular recesses 6', which preferably have different radii. 8 is a pin eccentrically secured to the journal 4, its upper end being hardened and carrying a sleeve 10 to which a disc-shaped holder 9 is secured. 11 are small pins movably suspended from the holder 9 and spaced according to the pitch of the wheel to be examined in such manner that the level of the pins 11 corresponds to the level of the wheel 1 and the abutment 6. The eccentricity of the pin 8 with respect to the journal 4 is so chosen that the pins 11 come in contact with the abutment 6 on the side adjacent to the toothed wheel 1 and are spaced from the abutment on the opposite side as will be clearly seen from Figs. 1 and 2. The slide 5 is connected to the diagram recording device 38, 39, 41 which indicates or records the variations of distance between the slides 3 and 5. The transport of the chart on the disk 41 on which the diagram is recorded, may be effected by means of a worm gear 46 on the shaft 42 of disk 41, and a worm 47 which is keyed on a shaft 12. Shaft 12 is mounted to rotate in bearings 49 and 50 at opposite ends of the frame 21 and is equipped with a crank 51 for rotating it. Another worm 52 is splined on the shaft 12 and entrained by lugs 53 and 54 on the slide 3. This worm meshes with the worm wheel 13 on the sleeve 44 so that the disk 41 and the journal 2 are both rotated by rotation of shaft 12.

The operation of this device is as follows:

The wheel to be examined is placed on the journal 2 as shown in Fig. 2 and the slide 3 is shifted towards the slide 5 by rotating spindle 29, as described so that some of the pins 11 enter the gaps between some teeth of the wheel 1. The diameter of the pins 11 is so chosen that the pins abut against the flanks of the teeth near the lines corresponding to the pitch circle of the wheel. The abutment 6 is adjusted in such manner that the recess 6' coming in contact with the pins 11 has a radius approximately corresponding to or greater than the radius extending from the centre of the wheel 1 through the periphery of the pin 11 in contact with the abutment 6. The slide 3 is moved towards the slide 5 so that the pins 11 abut against the abutment 6. Now the wheel 1 is slowly rotated by rotating shaft 12 and in consequence thereof the carrier 9 is rotated also, the pins 11 consecutively entering the gap between the teeth of wheel 1 and rolling on the abutment 6. Each pin after having passed between wheel 1 and the abutment 6 leaves the gaps and the abutment. If the toothed wheel 1 has an eccentricity, the distance between the slides 3 and 5 varies during the rotation of the wheel 1 since the wheel 1 exerts pressure on the abutment 6 through the pins 11. These variations may be recorded by means of the recording device 38, 39, 41. If the radius of the circular recess 6' in contact with the pins 11 is a little longer than the radius of the circle extending from the centre of wheel 1 and through the outer periphery of the pin 11, each pin 11, when passing between wheel 1 and abutment 6 causes a variation of the distance between the slides 3 and 5, so that the diagram recorded on the chart on disk 41 consists of a series of small humps. The diagram itself may be circular or in the form of a straight line according to the construction of the recording device. Preferably the recording device is so designed that the record is approximately circular, since in this case it is very easy to distinguish the faults caused by an eccentricity or by irregularities of pitch of the wheel 1 from each other, as will be seen from Figs. 8-11 showing some diagrams obtained with a device according to my invention.

Figure 8:
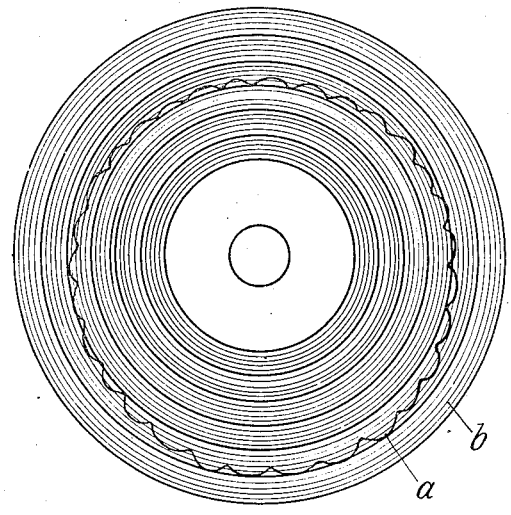
Figs. 8–11 are illustrations of diagrams obtainable in the operation of any of the devices illustrated in Figs. 1–7.

In the diagram of Fig. 8, $a$ is the line recorded by the longer arm 39 of the bellcrank connected with the slide 5 on paper $b$ provided with circular lines. The gear wheel corresponding to this diagram has 30 teeth and correspondingly the line $a$ has 30 humps. Since line $a$ is eccentric to the circles drawn on the paper $b$, it is evident that the wheel examined has an eccentricity the value of which can easily be calculated from the diagram. A corresponding diagram obtained with a toothed wheel having no eccentricity is shown in Fig. 9.

Figure 10:
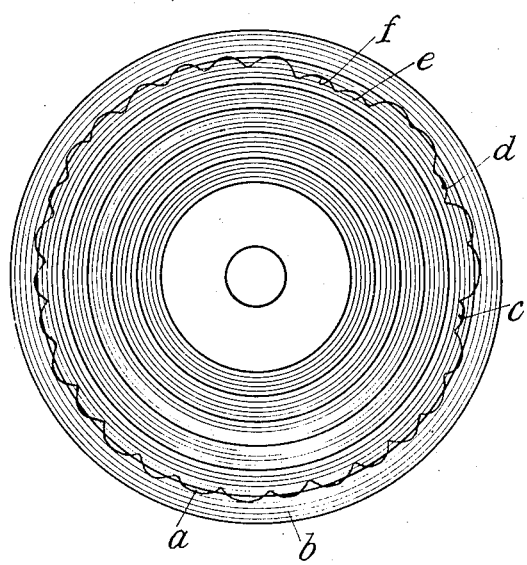

In the diagram shown in Fig. 10 the toothed wheel has no eccentricity but irregularities of pitch, which are indicated in the diagram at $c$, $d$, $e$ and $f$, showing that the corresponding tooth gaps are larger than the regular gaps, for the pins entered deeper into them than into the other gap so that the distance between the slides 3 and 5 was decreased, which is indicated in the diagram in that the humps $c$, $d$, $e$, $f$ are spaced less from the centre of the diagram than the other humps.

Figure 9:
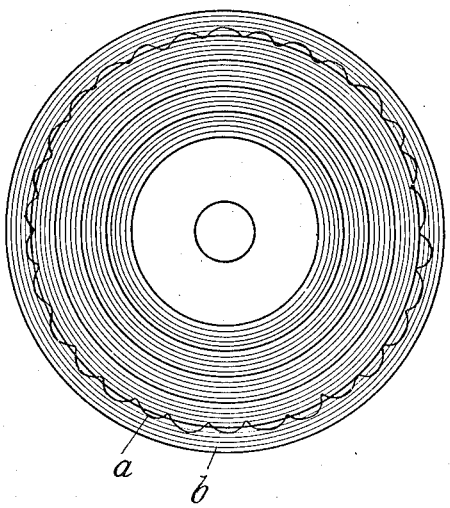
Figure 11:
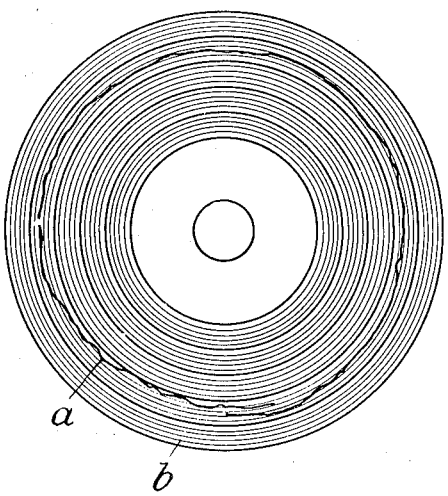

The diagram shown in Fig. 11 was produced with the same wheel as the diagram shown in Fig. 9. Instead of the device according to my invention, however, a master gear was used and it can be seen from Fig. 11 that the small irregularities of the wheel to be examined have combined with the irregularities of the master gear so that the line $a$ does not form as clear an illustration as the corresponding line in Fig. 9. Since the master gear and the wheel to be examined had unequal numbers of teeth, the end of line $a$ does not coincide with its beginning.

As will be seen from Figs. 8-10, the diagrams clearly and distinctly show the influences of eccentricity and of irregularities of pitch. If the recording device is so designed that a straight and not a circular diagram line is obtained, the irregularities of pitch are illustrated in a similar manner and the eccentricity of the wheel 1 causes a displacement of the diagram line with respect to its correct position.

Referring now to Fig. 3 of the drawings, the pins 11 are here loosely held on the holder 9' and the holder and the pins resemble the roller cage of a roller bearing. The holder 9' is arranged above the abutment 6 but the pins 11 are engaged by the wheel 1 like a pin wheel. The operation of this device is similar to that illustrated in Figs. 1 and 2 and the means for rotating the journal 2, the disk 41, etc., have been omitted in this and the following figures.

In the embodiment shown in Fig. 4 the holder 9' of the pins 11 is shaped similarly as in Fig. 3 but mounted on the journal 2 carrying the wheel 1 to be examined. In this embodiment the number of pins should correspond to the number of tooth gaps of the wheel 1.

In the device shown in Fig. 5 the pins 11 are supported by a cup-shaped holder 9'' arranged below the wheel 1 to be examined and mounted on the journal 2. The pins are inserted by hand into the tooth gaps of wheel 1. The operation of the devices shown in Figs. 4 and 5 is substantially the same as that of the device described in connection with Figs. 1 and 2.

In the embodiment shown in Figs. 6 and 7 the wheel 1 to be examined is mounted on a horizontal journal 2 as this embodiment is gravity-influenced. The abutment 6 has a somewhat different contour, however, the portion adjoining the wheel 1 is circular in shape. The pins 11 are secured in a magazine 20 comprising within a suitably formed casing a wheel 9''' conveying the pins along the casing in the direction of the arrow so that from the top side of the wheel 9''' the pins are delivered to an inclined surface 17 of the abutment 6 along which they slide by gravity into the space between the abutment and the wheel 1. After passing through this space the pins are fed back to the magazine 20 and lifted by the conveyer wheel 9'''. The shaft 16 of the conveyer wheel 9''' is driven by means of a worm gear 14, while the shaft 15 on which the wheel 1 is mounted is driven by a worm gear 13 and both worm gears 13 and 14 are driven simultaneously and synchronously by a hand-operated shaft 12. The shaft 12 which corresponds to the same shaft in Figs. 1 and 2, is splined for the reception of the worms (not visible) which mesh with the worm wheels 13 and 14 and move with the slides 3 and 5.

I wish it to be understood that I do not desire to be limited to the exact details of construction shown and described, for obvious modifications will occur to a person skilled in the art.

I claim:

1. Device for examining toothed wheels comprising a support for the wheel, an abutment displaceably arranged with respect to said support, means for drawing said support and said abutment towards each other, means for inserting a pin into the gap between a pair of teeth of the wheel and between said abutment and said teeth, means for rotating the wheel with respect to said abutment and means for recording the variations of distance between the axis of rotation of the wheel and said abutment.

2. Device for examining toothed wheels comprising a support for the wheel, an abutment displaceably arranged with respect to said support, means for drawing said support and said abutment towards each other, means for inserting pins into the gaps between a plurality of consecutive teeth of the wheel and between said abutment and said teeth, means for rotating the wheel with respect to said abutment and means for recording the variations of distance between the axis of rotation of the wheel and said abutment.

3. Device for examining toothed wheels comprising a support for the wheel, an abutment displaceably arranged with respect to said support, means for drawing said support and said abutment towards each other, a disc rotatably arranged above said abutment, a plurality of pins suspended from said disc, means for inserting said pins into the gaps between consecutive teeth of the wheel and between said abutment and said teeth, means for rotating the wheel with respect to said abutment and means for recording the variations of distance between the axis of rotation of the wheel and said abutment.

4. Device for examining toothed wheels comprising a support for the wheel, an abutment displaceably arranged with respect to said support and having peripheral circular recesses with radii at least as long as the radius of the wheel, means for drawing said support and said abutment towards each other, means for inserting a pin into the gap between a pair of teeth of the wheel and between said abutment and said teeth, means for rotating the wheel with respect to said abutment and means for recording the variations of distance between the axis of rotation of the wheel and said abutment.

5. Device for examining toothed wheels comprising a support for the wheel, an abutment displaceably arranged with respect to said support, means for drawing said support and said abutment towards each other, a disc rotatably arranged above said abutment, a plurality of pins suspended from said disc, means for inserting such pins in the gaps between consecutive teeth of the wheel and between said abutment and said teeth, means for rotating the wheel with respect to said abutment and means for recording the variations of distance between the axis of rotation of the wheel and said abutment.

6. Device for examining toothed wheels comprising a support for the wheel, an abutment displaceably arranged with respect to said support, means for drawing said support and said abutment towards each other, a magazine, pins stored in said magazine, means for consecutively introducing said pins into the gaps between the teeth of the wheel and between said abutment and said teeth, means for rotating the wheel with respect to said abutment, means for feeding said pins back into said magazine after they have rolled on said abutment, and means for recording the variations of distance between the axis of rotation of the wheel and said abutment.

7. A machine for testing gear wheels comprising a movable support, an abutment on said support, another movable support for the gear wheel to be tested, means for rotating the gear to be tested, a gauging pin, means for holding said gauging pin in the space defined by said abutment and by the sides of two adjacent teeth, of the gear wheel, and means for recording the relative displacement of said movable supports upon rotation of the gear wheel.

AUGUST RINDERKNECHT.